(12) United States Patent
Maindron et al.

(10) Patent No.: US 11,579,062 B2
(45) Date of Patent: Feb. 14, 2023

(54) OPTICAL PARTICLE SENSOR

(71) Applicant: COMMISSARIAT A L'ENERGIE ATOMIQUE ET AUX ENERGIES ALTERNATIVES, Paris (FR)

(72) Inventors: Tony Maindron, Grenoble (FR); Salim Boutami, Grenoble (FR); Christophe Kopp, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 48 days.

(21) Appl. No.: 17/305,070

(22) Filed: Jun. 30, 2021

(65) Prior Publication Data

US 2021/0404931 A1  Dec. 30, 2021

(30) Foreign Application Priority Data

Jun. 30, 2020  (FR) ..................... 20 06905

(51) Int. Cl.
  *G01N 15/02* (2006.01)
  *G01N 15/00* (2006.01)

(52) U.S. Cl.
  CPC ............ *G01N 15/0211* (2013.01); *G01N 2015/0038* (2013.01)

(58) Field of Classification Search
  CPC ....... G01N 15/0211; G01N 2015/0038; G01N 15/1434; G01N 21/532; G01N 15/1436;
  (Continued)

(56) References Cited

U.S. PATENT DOCUMENTS 6,315,955 B1 * 11/2001 Klein ................. G01N 15/06
356/432
6,476,911 B1 * 11/2002 Rose .................. G01N 15/0205
356/342

(Continued)

OTHER PUBLICATIONS

French Preliminary Search Report dated May 6, 2021 in French Application 20 06905 filed on Jun. 30, 2020, 10 pages (with English Translation of Categories of Cited Documents & Written Opinion).

(Continued)

*Primary Examiner* — Roy M Punnoose
(74) *Attorney, Agent, or Firm* — Oblon, McClelland, Maier & Neustadt, L.L.P.

(57) ABSTRACT

The invention provides an optical particle sensor (1) comprising:
  at least one light source (2, 2r, 2g, 2b) configured to emit light rays (20),
  at least one channel (3) intended to receive a fluid transporting at least one particle (30), and to at least partially receive the light rays (20) emitted by the at least one source (2, 2r, 2g, 2b), such that said light rays (20) are partially scattered by the at least one particle (30),
  at least one photodetector (4) capable of receiving said scattered light rays (20),
said sensor (1) being characterised in that the at least one source (2, 2r, 2g, 2b) has an emission face (21) facing one side (D) of the sensor and in that the at least one photodetector (4) has a receiving face (41) facing the same side (D) of the sensor (1), such that the light rays received by the at least one photodetector are light rays (20b) backscattered by the at least one particle (30), for at least 90% of them.

24 Claims, 6 Drawing Sheets

(58) Field of Classification Search
CPC ......... G01N 15/1459; G01N 2015/144; G01N 2201/0628
See application file for complete search history.

(56) References Cited

U.S. PATENT DOCUMENTS

| | | | |
|---|---|---|---|
| 6,573,991 B1* | 6/2003 | Debreczeny | G01N 15/0211 356/336 |
| 8,681,331 B2* | 3/2014 | Xie | G01N 21/53 356/342 |
| 2002/0180972 A1* | 12/2002 | Ansari | G01N 15/0211 356/336 |
| 2004/0004717 A1* | 1/2004 | Reed | G01N 15/14 356/338 |
| 2005/0018188 A1* | 1/2005 | Arrivo | G01N 21/359 356/335 |
| 2013/0162994 A1* | 6/2013 | Xie | G01N 21/636 356/342 |
| 2015/0253236 A1* | 9/2015 | Cheng | G01N 15/0211 356/342 |

OTHER PUBLICATIONS

Tan et al., "Analysis and optimization on the angular color shift of RGB OLED displays", Optics Express 33629, vol. 25, No. 26, Dec. 25, 2017, 14 pages.
Wartenberg, et al., "SVGA Full-Color Bidirectional OLED Microdisplay", SID 2015 Digest, 2015, pp. 204-206.
Zhang et al., "Highly Directional Emission and Beam Steering from Organic Light-Emitting Diodes with a Substrate Diffractive Optical Element", Advanced Optical Materials, 2014, pp. 343-347.

\* cited by examiner

OPTICAL PARTICLE SENSOR

TECHNICAL FIELD

The present invention relates to the field of the optical detection of particles in general and more particularly of micron-sized, even nano-sized particles. For example, it finds an application in the optical counting of particles.

Particularly advantageous, but non-limiting, fields of application are, for example: the air quality control, the detection of microbiological species, the detection of explosive powder, the fire detection, the alarm systems which are not very sensitive to false positives.

STATE OF THE ART

The particles are airborne solid, liquid or wet solid microscopic objects. Their sizes vary from a few tens of nanometres to a few tens of micrometres. These particles come from various sources such as forest fires, construction sites, industrial sites, motor vehicles, etc.

When the concentration of these particles exceeds a certain threshold, they have an adverse impact on the environment and/or health. Thus, states have set maximum concentration thresholds. For example, the European Union allows maximum concentrations of 50 µg/m3 for the particles with a size comprised between 10 µm and 2.5 µm and 25 µg/m3 for the particles with a size smaller than 2.5 µm.

It is therefore necessary to accurately detect the presence and the concentration of these particles by size range.

Different particle detection methods exist, such as the methods for detecting by gravimetry, by ionisation, by beta attenuation, the methods for detecting by measuring aerodynamic mobility or electric mobility, the optical detection methods.

The latter are advantageously simpler to implement, and more widespread.

The optical particle sensors are generally based on detecting an interaction between a light and particles. In practice, the particles to be detected pass through an area illuminated by a light source, typically a channel.

If particles are present in the illuminated area, they will absorb a portion of the light which comes from the source and will scatter another portion of this light out of the main propagation direction, according to the scattering phenomenon.

A first optical detection method, called obscuration measurement, therefore consists in measuring the absorption of the light through a cloud of particles or an accumulation of particles. This measurement allows determining the concentration of particles using the Beer-Lambert law if the composition of the cloud of particles is known a priori.

A second method consists in analysing the light scattered outside the optical axis. The angular analysis of the scattered light is done from the recording of a scattering diagram. It allows determining the shape, size, optical index and the concentration of the particles. For example, the size, the refractive index and the concentration of particles can be determined from light scattering theories, for example the Mie theory (Ref: Bohren and Huffmann, Absorption and scattering of light by small particles, Ed. Wiley and Sons, 1983).

The optical particle counters operate on the principles mentioned above. They have the particularity that the illuminated area is geometrically limited, for example by focusing to a laser source and/or by a microfluidic channel and/or by a system of aerodynamic lenses. This geometric limitation allows detecting single particles rather than clouds.

One solution allowing producing such counters or optical particle sensors by improving their robustness and by reducing their cost consists in integrating these counters/sensors into miniaturised chips using microelectronics and photonics technologies.

The document FR3062209 describes such an integrated sensor. This sensor comprises in particular a discrete assembly of photodetectors forming a retina as well as reflective surfaces for projecting, onto the retina, the image of the light scattered by the particle(s). A characteristic scattering diagram of the particle is thus obtained.

In practice, it turns out that the sensitivity of this type of sensor is limited and that particles, in particular those with small sizes, may not be detected.

There is therefore a need consisting in improving the sensitivity of the particle sensors, and in particular for the detection of small-sized particles. A reliable detection of these small particles is an important issue since they are generally the most dangerous for health.

An object of the present invention is to propose such a particle sensor allowing improving the detection of small particles.

The other objects, features and advantages of the present invention will become apparent on examining the following description and the accompanying drawings. It is understood that other advantages can be incorporated.

SUMMARY

In order to achieve these objectives, the present invention proposes an optical particle sensor comprising:
- at least one light source configured to emit light rays,
- at least one channel intended to receive a fluid transporting at least one particle, and to at least partially receive the light rays emitted by the at least one source, such that said light rays are partially scattered by the at least one particle,
- at least one photodetector capable of receiving said scattered light rays.

Advantageously, the at least one source has an emission face facing one side of the sensor and the at least one photodetector has a receiving face facing the same side of the sensor, such that the light rays received by the at least one photodetector are light rays backscattered by the at least one particle, for at least 90% of them.

Thus, the majority or even all light rays detected by the sensor are light rays backscattered by the at least one particle. Such a sensor considerably reduces or eliminates the portion of non-scattered light rays which do not carry information relating to the at least one particle, and which are likely to dazzle the at least one photodetector.

In the context of the development of the present invention, it has indeed appeared that, in the sensor of the prior art described in the document FR3062209 mentioned above, a portion of the light rays which are not scattered by the particles and which are therefore not useful for detecting particles, dazzles the sensor. This dazzling can totally prevent the detection of small particles.

By illuminating a particle with incident light rays emitted by an emission face of a source, a portion of the rays scattered by the particle is scattered "in front" of the particle, so as to move away from the emission face, in the direction of propagation of the incident rays, while another portion of the scattered rays is backscattered, "behind" the particle, so as to return to the side of the emission face, in the direction opposite to the direction of propagation of the incident rays.

The intensity of the "backscattered" portion is generally lower than that of the "frontally" scattered portion (in the direction of propagation or in front of the particle).

The rays which are not scattered by the particle are propagated, in turn, in the direction of propagation, unless they are reflected in the direction of the emission face, for example by a mirror.

By turning the emission face and the detection face on the same side of the sensor, the only light rays received by the at least one photodetector are therefore either rays backscattered by the particle, or rays reflected, for example by a wall of the sensor.

According to a prejudice of the prior art, the only backscattered rays do not allow collecting sufficient information on the particle and it is therefore necessary to also collect the frontally scattered rays, for example by using a mirror.

On the contrary, it was highlighted during the development of the present invention that the fact of collecting mainly or even only the light rays backscattered by the particle (signal) not only allows obtaining sufficient information on the particle, but also drastically reduces or eliminates the dazzling due to the parasitic reflections of the non-scattered rays (noise). The optical sensor according to the invention thus allows very significantly reducing the dazzling of the at least one photodetector. The signal to noise ratio of the sensor is increased. This improves the sensitivity of the sensor and the detection capability of the small particles.

Moreover, the small particles, typically having a diameter of less than 10 µm or even less than 1 µm, scatter light isotropically in all directions of the space. The light portion "backscattered" by these small particles is therefore substantially equal to the light portion "frontally" scattered by these small particles. The larger particles scatter proportionally less "backscattered" light than frontally" scattered light. However, the larger particles in absolute terms scatter more light than the small particles. The intensity level of light "backscattered" by the large particles is thus at least as high as the intensity level of light "backscattered" by the small particles. The sensor according to the invention therefore allows detecting both small particles and larger particles, with a weighting favourable to the detection of the small particles.

Thus, the present invention proposes an effective solution for improving current sensors, in particular to improve the detection of the small particles with a diameter typically less than 10 µm.

BRIEF DESCRIPTION OF THE FIGURES

The aims, objects, as well as the features and advantages of the invention will become more apparent from the detailed description of embodiments thereof which are illustrated by the following accompanying drawings in which.

Figure 1:
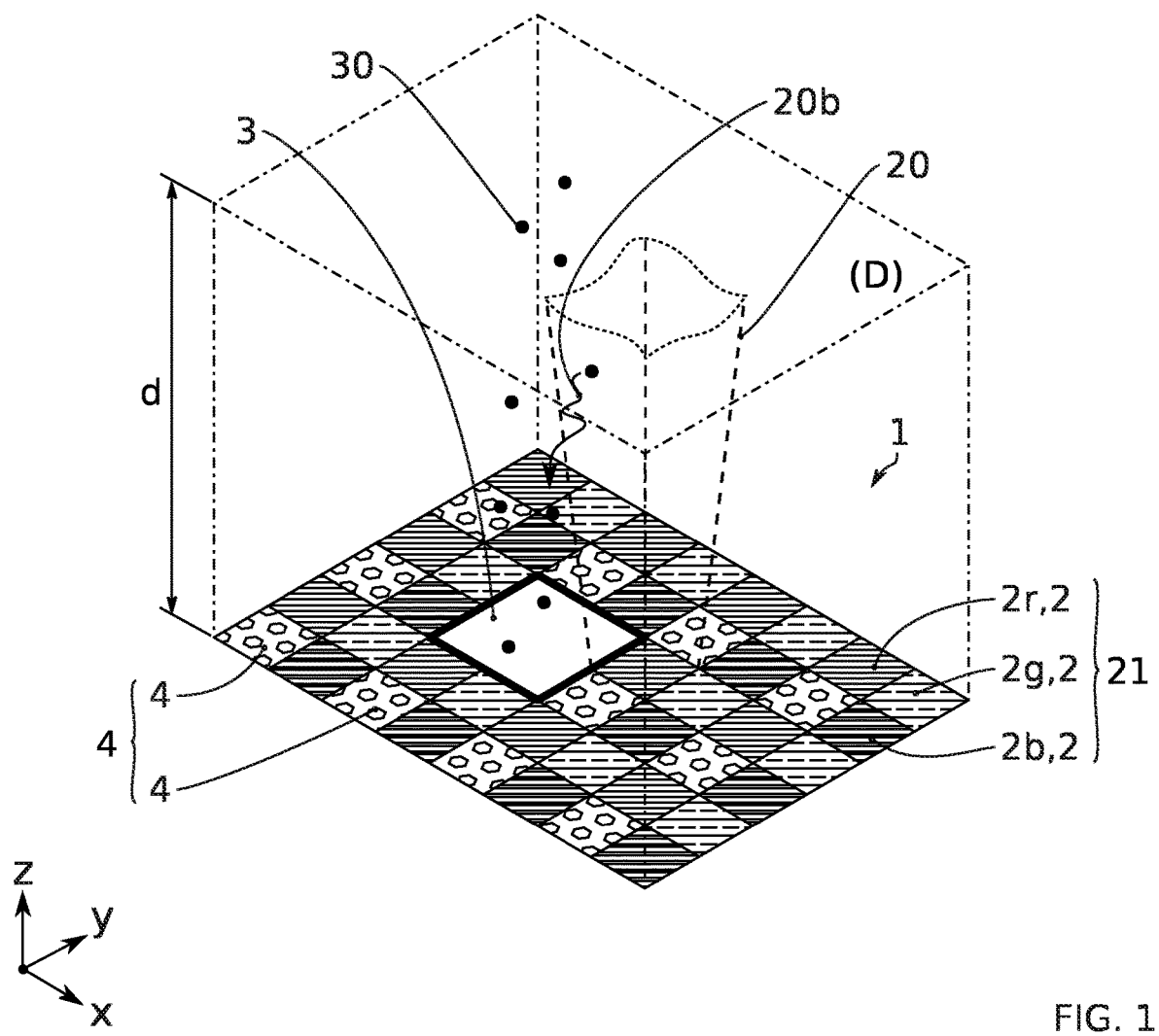
FIG. 1 schematically illustrates a particle sensor according to one embodiment of the present invention.

The drawings are given by way of example and are not limiting of the invention. They constitute schematic representations of principle intended to facilitate the understanding of the invention and are not necessarily at the level of practical applications. In particular, the dimensions of the different elements (particles, emitter, channel, photodetector) are not representative of reality.

DETAILED DESCRIPTION

Before starting a detailed review of embodiments of the invention, it is recalled that, optionally, the invention comprises at least any one of the following optional features which can be used in combination or alternatively.

According to one embodiment, the optical sensor is configured such that the light rays received by the at least one photodetector are only light rays backscattered by the at least one particle. This allows avoiding the dazzling of the photodetector by parasitic light rays, in particular non-scattered and reflected light rays.

According to one embodiment, the optical sensor is configured such that the light rays received by the at least one photodetector are not reflected after having been scattered by the at least one particle. This allows avoiding the need for a mirror. The cost of the sensor is reduced.

According to one embodiment, the optical sensor comprises walls which delimit a volume inside which the channel extends and the light rays emitted by the at least one source are propagated. Said walls, for example their coating and/or their surface state, are typically configured so as to prevent light rays which are not scattered by the at least one particle from reaching the at least one photodetector, for at least 95% of them. This allows limiting or even eliminating possible parasitic reflections on the walls.

According to one embodiment, the walls are configured such that the light rays received by at least one photodetector are light rays backscattered by the at least one particle, for at least 90% of them.

According to one embodiment, the walls absorb at least 95% of the light rays which are not scattered by the at least one particle. This allows limiting even eliminating possible parasitic reflections on the walls.

According to one embodiment, the walls facing the emission face are remote from the photodetectors by a distance greater than 10 mm, preferably greater than 20 mm, preferably greater than 50 mm. This allows reducing the number of non-scattered light rays reaching the walls. This allows limiting even eliminating possible parasitic reflections on the walls.

According to one embodiment, the walls are not parallel to the emission face. This allows deflecting possible parasitic reflections occurring on the walls, outside the detection directions of the photodetectors. This allows preventing possible light rays, which are not scattered by the particle and reflected by the walls, from reaching the detection face.

According to one embodiment, the emission and receiving faces are parallel to each other. This simplifies the design of the sensor.

According to one embodiment, the emission and receiving faces are planar and located substantially in the same plane. This allows optimising the amount of signal received by the detection face, for a given emission power at the emission face. The sensitivity of the sensor is improved.

According to one embodiment, the receiving face(s) corresponds/correspond to the surface of the photodetector(s). The optical sensor does not comprise optical fibres or waveguide between the receiving face and the surface of the photodetector. Alternatively or in combination, the emission face(s) corresponds/correspond to the surface of the source(s) or emitter(s). Similarly, the optical sensor therefore does not require and does not comprise optical fibbers or waveguide between the emission face and the surface of the source. The absence of such optical fibbers or such waveguides advantageously allows reducing the cost of the optical sensor. This also allows improving the compactness of the optical sensor.

According to one embodiment, the emission and receiving faces are entirely contained in a space delimited by two parallel planes, the optical sensor being configured such that the at least one particle is located outside this space when it scatters the light rays.

According to one embodiment, the at least one source and the at least one sensor are disposed around the at least one channel and transversely to said at least one channel. According to one embodiment, said emission and receiving faces are contained in planes disposed transversely to said at least one channel.

In one embodiment, the at least one source entirely surrounds the at least one channel, the at least one source being taken from a single source or a plurality of sources. This allows homogenising the illumination of the channel.

According to one embodiment, the at least one source comprises a plurality of sources and the sources are continuously distributed around the channel. This means that the sources are juxtaposed to each other, around the channel.

According to one embodiment, the sources and the detectors are continuously distributed around the channel. This means that the sources and the detectors are juxtaposed to each other, around the channel. The sources and the detectors are not necessarily evenly distributed or uniformly alternating. Together they form a continuity around the channel.

According to one embodiment, the at least one photodetector comprises a plurality of light detectors, and the detectors are continuously distributed around the channel. This means that the detectors are juxtaposed to each other, around the channel.

According to one embodiment, the at least one source comprises a plurality of sources and the sources are discontinuously distributed around the channel. This means that the sources are disposed around the channel while being separated from each other by a space.

According to one embodiment, the at least one photodetector comprises a plurality of light detectors, and the detectors are discontinuously distributed around the channel. This means that the detectors are disposed around the channel by being separated from each other by a space.

According to one embodiment, the sources and the detectors are discontinuously distributed around the channel. This means that the sources and the detectors are disposed around the channel while being separated from each other by one or more space(s).

According to one embodiment, the at least one source has a shape of a ring or ring portion at least partially surrounding the at least one channel.

According to one embodiment, the at least one source is disposed along a first circuit around the at least one channel, and wherein the at least one sensor is disposed along a second circuit around the at least one channel, said first and second circuits being concentrically arranged around the at least one channel. This allows optimizing the illumination of the channel and the detection of the signal.

According to one embodiment, the optical sensor comprises a deflection structure and the light rays emitted by the at least one source are deflected towards the at least one channel by the deflection structure. This allows improving the illumination of the channel.

According to one embodiment, the deflection structure is formed on the emission face and has a refractive index gradient in a plane parallel to the emission face. Such a deflection structure can be easily made by microelectronic technologies.

According to one embodiment, the deflection structure is selected from a photonic crystal, a refractive microlens.

According to one embodiment, the at least one source comprises at least two adjacent light emitters each comprising an emission cavity having a different height.

According to one embodiment, the deflection structure is formed by the difference in heights between the emission cavities of said at least two adjacent light emitters. Such a deflection structure can be easily made by the microelectronic technologies. It allows effectively deflecting the emitted light, for example by several tens of degrees relative to the optical axis.

According to one embodiment, the at least one source is an organic light-emitting diode (OLED). This allows making various forms of source.

According to one embodiment, the at least one photodetector is an organic photodetector (OPD). This allows making various forms of photodetector.

According to one embodiment, the at least one source is an inorganic light-emitting diode (LED), for example based on GaN. According to one embodiment, such a diode is a micro-diode (µLED) and has a characteristic dimension of less than 100 µm, preferably less than 50 µm, even less than 30 µm.

According to one embodiment, at least one photodetector is an inorganic (PD) photodetector, for example based on silicon.

According to one embodiment, the at least one source comprises a plurality of light emitters, said emitters being arranged in the form of an emission matrix.

According to one embodiment, the at least one photodetector comprises a plurality of light detectors, said detectors being arranged in the form of a detection matrix.

According to one embodiment, the emission and detection matrices are arranged such that the light emitters are alternated with the light detectors. This allows optimising the illumination of the channel and detection of the signal.

According to one embodiment, the at least one source comprises several light emitters and the at least one photodetector comprises several light detectors, the emitters and the detectors being arranged in the form of a matrix having cells, each cell being formed by an emitter or a detector.

According to one embodiment, all detectors are separated from each other by emitters.

According to one embodiment, all emitters are separated from each other by detectors.

According to one embodiment, the plurality of light emitters comprises first, second and third subsets of light emitters, the light emitters of said subsets being configured to emit light radiations having respectively first, second and third wavelengths which are different from each other. This allows obtaining different information about the particle to be detected, for example its nature or its size.

According to one embodiment, the sensor is configured so that the light emitters can be sequentially switched-on or switch-off. This allows obtaining different information about the particle to be detected, for example its position in the channel.

Unless specifically stated otherwise, technical features described in detail for a given embodiment can be combined with the technical features described in the context of other embodiments described by way of example and without limitation. In particular, the number, the shape or the nature of the channels, emitters and/or photodetectors which are illustrated in the Figures can be combined so as to form another embodiment which is not necessarily illustrated or described. Such an embodiment is obviously not excluded from the invention.

The present invention finds as a preferred field of application the detection of particles of various sizes, preferably in the field of microscopic or even nanometric particles. For example, the present invention can be used for the detection of particles resulting from smoke, explosive powder, polluting particles, dust particles, allergen particles such as pollens, mould spores, or else carcinogenic particles, or biological particles such as bacteria, viruses, or even exosomes.

The present invention applies to any type of particle conveyed by a fluid, whether the latter is liquid and/or gaseous.

The fluid present or flowing in the channel is, for example, air. This is the case for the sensors integrated in the following systems: a fire alarm system, a fire detection system, an explosive powder detection system, a system for analysing the quality of a fluid such as air, an anti-pollution alarm system.

Alternatively, the fluid can be a liquid such as water. This is the case for sensors integrated in the systems for detecting microbiological species.

Within the scope of the present invention, the term "particle" or the equivalents thereof is defined as a constituent of a physical system considered as elementary relative to the studied properties.

The term "particle" designates in particular a solid, liquid or wet solid object in suspension in a fluid such as air and whose size is microscopic. For example, a particle is a material element whose largest dimension is less than a few millimetres ($10^{-3}$ metres), preferably than one millimetre, and preferably than a few tens of micrometres ($10^{-6}$ metres) and preferably less than one micrometre, or even in the nanometre range ($10^{-9}$ m). More generally, the particles have a size greater than 40 Å ($10^{-10}$ m) and are therefore considered as optically continuous. In general, these are objects composed of matter whose dimensions are small relative to the dimensions of the cavity or the particle circulation channel.

The term "size" or "diameter" of a particle means the maximum distance between two points of the particle. Typically, a particle is assimilated to an object of spherical geometry, its size therefore corresponds to the diameter of the sphere.

Within the scope of the present invention, the term "around" means "surrounds at least 50%, preferably at least 80%, preferably entirely surrounds the channel". In what follows, the term "absorption" or the equivalents thereof refers to the phenomenon by which the energy of an electromagnetic wave is transformed into another form of energy, for example by heat dissipation. In the present description, a material is considered as absorbent when it absorbs at least 5% of a light radiation, preferably at least 25% and advantageously at least 50%.

In what follows, the term "scattering" or the equivalents thereof refers to the phenomenon by which a propagation medium produces a distribution, in many directions, of the energy of an electromagnetic wave, for example a light wave.

In what follows, the term "reflection" or the equivalents thereof refers to the phenomenon of re-emission from an element or a surface of incident light radiation. In the present description, an element is considered as reflective when it re-emits at least one portion of an incident light radiation, this portion being greater than or equal to 50%, preferably this portion being greater than or equal to 80%.

In the present invention, an essential principle consists in detecting "backscattered" light rays. The term "backscattered" or "backscattering" means a set of light rays scattered by the particle which are directed to the side of the source from which they originate. It can thus be imagined that these backscattered light rays turn back. Generally, the backscattering occurs in the half-space delimited by a plane comprising the particle, typically the centre of the particle, this plane being perpendicular to the main emission direction of the source. Thus, the backscattering is not limited only to the rays scattered in the direction of the incident rays and in an orientation opposite to the incident rays. The backscattered rays can also be seen as rays reflected by the particle in the half-space comprising the source.

The backscattered rays are not reflected towards the detectors by a wall, a mirror or a reflector, or any structure (metal grid or other). They can nevertheless be slightly deflected, for example by refraction, when they return to the photodetectors.

The plurality of photodetectors is preferably typically in the form of one or more matrices of photodetectors, also referred to as detection matrices. The photodetectors then constitute pixels of the sensor. These detection matrices are preferably held in the vicinity the channel, possibly by a transparent support.

In the present invention, a "receiving face" and a "detection face" are used as synonyms.

The field of view is the solid angle at which the sensor is sensitive to electromagnetic radiations.

The light rays are emitted by one or more source(s), also called emitters. A plurality of sources is preferably typically in the form of one or more emission matrices. The sources then constitute pixels or sub-pixels of the emission matrix. These emission matrices are preferably held in the vicinity of the channel, possibly by a transparent support.

The term material which is "transparent at a given wavelength" or simply "transparent" means a material which passes at least 90% of the luminous intensity of the light exhibiting this wavelength.

The sources can be polychromatic or monochromatic. The light emitted by these sources preferably belongs to the visible range extended to the near ultraviolet and the near infrared, that is to say for a wavelength range comprised between 300 and 1000 nm. The "wavelength" of the source designates a wavelength of interest, for example the wavelength with the greatest luminous intensity or the central wavelength of the emission spectrum of the source.

In the case of a polychromatic source, this wavelength of interest can also mean a range of wavelengths of a few tens of nanometres, for example in the range of 100 nm, preferably in the range of 50 nm.

In the case of a monochromatic or quasi-monochromatic source, the wavelength of interest is the single wavelength emitted by this source or the wavelength which is mainly emitted by this source.

The emission of the light source can be characterised by the curve $I=f(\theta)$ giving the value of the intensity I depending on the direction of observation according to the angle $\theta$. This polar curve is generally called an emission intensity indicator or an emission indicator.

The light intensity emitted by a so-called Lambertian source typically varies depending on the observation direction. In the case of such a quasi-point source, i.e. of small size relative to the observation distance, and having a planar emission face, the emission indicator thereof is the sphere of equation $I=I0 \cdot \cos(\theta)$.

Two surfaces are called parallel surfaces if any normal to one is a normal to the other and if the distance between two points belonging to each of the two surfaces and to the same normal common to the two surfaces, is constant.

A face can typically be a surface portion. Thus two parallel faces are two surface portions which are themselves parallel. First and second faces parallel to each other can thus be disposed offset from each other such that the projection of the first face on the surface to which the second face belongs does not necessarily cover said second face. These faces called parallel faces can for example be located on two planes parallel to each other, without one obscuring the other for an observer located opposite to these parallel faces.

Within the scope of the present invention, the photodetectors and the emitters are facing the same side of the sensor. This side is located opposite to the detection and emission faces, relative to the particle. This means that the photodetectors detect rays and that the emitters emit rays substantially in the same half-space, this half-space being delimited by a plane passing through the detection face and/or the emission face.

According to one example, the emission faces of the emitters and the receiving faces of the photodetectors are, preferably all, located in the same half-space of the sensor. This half-space is delimited by a plane passing through the portion of space in which a particle can be present and scatter a light ray emitted by an emitter.

According to one example, the emission faces of the emitters and the receiving faces of the photodetectors are parallel to each other and parallel to said plane. According to another example, this plane is parallel to a lower face of a substrate supporting the emitters and the receivers. According to another example, this plane is perpendicular to a direction in which the channel mainly extends. According to another example, this plane is perpendicular to a main direction of flow of the fluid carrying the at least one particle.

The term "structural element" means a layer "based on" a material A, a structural element, a layer comprising this material A only or this material A and possibly other materials, for example doping elements or alloying elements. Thus, if an emitter or a detector is designated as being "based on organic matter or polymers", this means that it can be formed only of polymers, or mainly of polymers and possibly other materials, for example a thin layer of inorganic oxide or metal.

It is specified within the scope of the present invention, the term "on", "overcomes", "covers" or "underlying" or the equivalents thereof do not mean "in contact with".

The relative terms "under" "on", "overcomes", "underlying" indicate relative positions along the axis z of the reference mark shown in the accompanying figures.

The terms "substantially", "approximately", "in the range of" mean "within 10%" or, when it is an angular orientation, "within 10°" and preferably "within 5°". Thus, a direction which is substantially normal to a plane means a direction having an angle of 90±10° relative to the plane.

A first example of a sensor according to the invention will now be described with reference to FIG. 1. The operating principle of this sensor 1 is as follows:

One or more sources, for example (O)LEDs 2g, 2b, 2r, forms an emission face 21 bordering or at least partially surrounding the channel 3 in which the particles 30 circulate. This emission face 21 is facing a side D of the sensor 1, for example a wall 50 opposite to the sources.

One or more photodetectors 4 form a detection face 41 bordering or at least partially surrounding the channel 3. This detection face 41 is facing the same side D of the sensor 1 as the emission face 21.

Thus, the detection face 41 cannot directly receive light rays 20 emitted by the emission face 21. The photodetectors 4 are therefore not dazzled by the light rays 20.

The emission 21 and detection 41 faces can be located in the same plane. According to another possibility, these faces 21, 41 are comprised between two parallel planes separated by a small distance, for example less than 20 μm. The faces 21, 41 can possibly be curved.

At least one portion of the light rays 20 emitted by the emission face 21 is directed towards the channel 3. When a particle 30 present in the channel 3 is illuminated by these light rays 20 directed towards the channel 3, it partially scatters these light rays 20, in a plurality of directions around the particle 30. A part of the light rays scattered by the particle 30 is thus backscattered in the direction of the receiving face 41 of the sensor 1. These backscattered light rays 20b are then collected by the photodetectors 4 and form a backscattering signal which can be used for the detection and analysis of the particle 30. Advantageously, this backscattering signal is not polluted or noisy by parasitic signals originating from the non-scattered light rays 20 which are directed opposite to the backscattered light rays 20b, towards the D side of the sensor 1. The detection sensitivity of the sensor 1 is thus improved. Reducing the background noise associated with the dazzling thus allows detecting very small particles, for example of size less than 1 μm, or even less than 100 nm.

The sensor 1 can typically comprise a wall 50 opposite to the sources 2, 2g, 2b, 2r, for example so as to form a casing. This wall 50 is preferably configured to prevent the reflection of the light rays 20 towards the photodetectors 4. It preferably comprises a coating absorbing at least 90% of the light rays 20 and preferably at least 95% of the light rays 20. Alternatively or in combination, the wall 50 is located at a sufficiently large distance d, for example greater than 20 mm, from the sources and/or the photodetectors 4. This promotes the dispersion and/or the attenuation of the non-scattered light rays 20. According to another possibility, the wall 50 is inclined so as to direct possible reflections of the light rays 20 outside the field of view of the photodetectors 4.

The photodetectors 4 can typically be silicon-based photodiodes (PD) or organic photodiodes (OPD). They can be distributed in the form of a detection matrix as shown in FIG. 1. They are typically associated with reading or control electronics based on complementary metal-oxide-semiconductor (CMOS) transistors. According to one possibility, the photodetectors 4 are pixels of a CMOS imager. They are distributed around the channel 3, which can be in the form of a hole in the CMOS imager. The photodetectors 4 form a detection face 41 which can typically extend in a plane xy. According to another possibility, the detection face 41 is curved. It is not necessarily planar. The photodetectors 4 can be partially alternated with the sources 2, 2g, 2b, 2r.

As illustrated in FIG. 1, the sources 2, 2g, 2b, 2r can be disposed so as to separate the photodetectors 4. They can be more numerous than the photodetectors 4. The spatial arrangement of the sources 2, 2g, 2b, 2r and the photodetectors 4 around the channel 3 can be selected depending on the needs, in particular so as to increase the signal-to-noise (S/N) ratio of the sensor 1. This allows optimising the analysis of the particles 30. Other examples of arrangement of the photodetectors 4 and the sources 2, 2g, 2b, 2r are given below.

The sources 2, 2g, 2b, 2r can typically be light-emitting diodes (LED) or organic light-emitting diodes (OLED). They can be distributed in the form of an emission matrix as illustrated in FIG. 1. According to one possibility, the sources 2, 2g, 2b, 2r are pixels 2 or sub-pixels 2g, 2b, 2r associated with CMOS electronics. The sources 2, 2g, 2b, 2r can emit according to different wavelengths. The sources 2b are for example blue sub-pixels. The sources 2r are for example red sub-pixels. The sources 2g are for example green sub-pixels. The CMOS control electronics associated with the sources 2, 2g, 2b, 2r typically allow driving the switch-on and the switch-off of these sources 2, 2g, 2b, 2r. According to an advantageous possibility, the sources 2, 2g, 2b, 2r are turned on or off independently. It is thus possible to sequentially turn on or off different pixels or sub-pixels during the passage of a particle 30 in the channel 3. For example, the blue sub-pixels are turned on while the red and green sub-pixels are turned off. This allows obtaining a first backscattering signal giving first information about the particle via a first scattering diagram according to a first blue wavelength. The red sub-pixels are then turned on while the blue and green sub-pixels are turned off. This allows obtaining a second backscattering signal giving second information about the particle via a second scattering to diagram according to a second red wavelength. The green sub-pixels are then turned on while the blue and red sub-pixels are turned off. This allows obtaining a third backscattering signal giving third information about the particle via a third scattering diagram according to a third green wavelength. By acquiring scattering diagrams at different wavelengths A, the average diameter φ of the particles can be calculated more easily. This average diameter φ can in particular be calculated for the very small particles by a Rayleigh law linking the scattered intensity to $\Phi^6/\lambda^4$. The acquisition of multiple scattering diagrams at different wavelengths A also allows obtaining more information on the nature of the particle.

According to another possibility, the pixels 2 all have substantially the same wavelength and are evenly distributed around the channel 3. Subsets of these pixels 2 can then be turned on and off sequentially around the channel so as to illuminate the particle 30 from different angles of view. The detection of the different backscattering signals then allows providing information on the position of the particle 30. The switch-on of the sources 2, 2g, 2b, 2r which are spatially distributed on the emission matrix also allows scanning a larger volume of the space. This increases the likelihood of detecting a small particle.

According to one possibility, the sensor 1 comprises CMOS electronics on which PDs and LEDs are co-integrated. According to one possibility, the sensor 1 comprises CMOS electronics on which OPDs and OLEDs are co-integrated. This last embodiment allows in particular obtaining sources 2 and photodetectors 4 having respectively emission 21 and detection 41 faces substantially in the same plane. Various forms of OPDs and OLEDs can further be made. The techniques for making these OPDs and OLEDs, for example by evaporation of pi-conjugated organic molecules through shadow masks or by liquid process, for example in screen printing or inkjet printing, are known to the person skilled in the art. According to one possibility, the sensor 1 comprises CMOS electronics on which OPDs and LEDs are co-integrated. According to one possibility, the sensor 1 comprises a CMOS electronics on which PDs and OLEDs are co-integrated.

The characteristic dimension of the sources 2 and/or the photodetectors 4, for example their smallest dimension in the xy plane, can be comprised between 10 μm and 500 μm, typically between 20 μm and 100 μm. This allows obtaining a good angular acceptance for the photodetectors 4. This further allows releasing the constraints of spatial resolution for the sources 2 and/or the photodetectors 4. This increases the number of technologies which can be used for making the sensor 1. It is thus possible to use only technologies based on organic materials (OPD and/or OLED), or technologies based on inorganic materials (PD and/or LED), or hybrid technologies mixing organic and inorganic materials. The pitch separating two adjacent sources 2 and/or photodetectors 4 may be comprised between 1 μm and 200 μm. This also allows improving the angular acceptance and/or releasing the constraints of spatial resolution for the sources 2 and/or the photodetectors 4.

The channel 3 can be formed directly in an area of the CMOS electronics provided for this purpose, generally without pixels (source or photodetector) and without interconnections (these being diverted outside the channel area), and delimited by a sealing ring. The channel 3 can typically be laser drilled inside this sealing ring. According to one possibility, several channels 3 can pass through the emission and detection matrices.

Figure 2A:
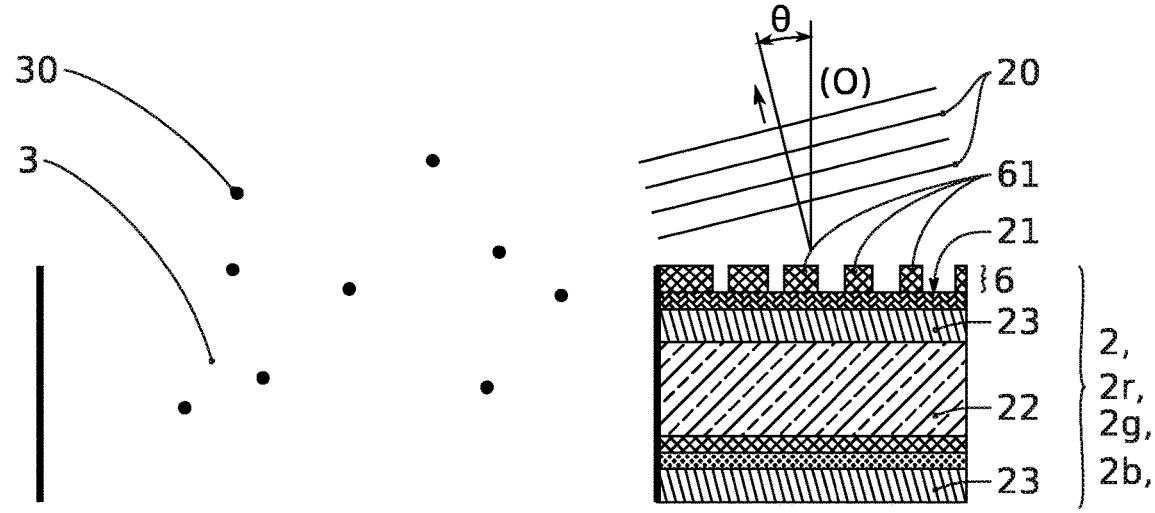
FIG. 2A schematically illustrates in section an emitter comprising a deflection structure according to one embodiment of the present invention.

As illustrated in FIG. 2A, a LED or OLED source 2 typically comprises an active region 22 where radiative recombinations of charge carriers occur, and injection regions of the charge carriers connected to electrical contacts 23. In a known manner, other layers, for example passivation layers, or antireflection layers, can also be integrated into these sources 2.

This type of source 2 has a Lambertian emission. For an emission face 21 extending parallel to the xy plane, the main emission direction of the source (maximum intensity of the emission indicator) is then substantially parallel to the optical axis (0) of the source, that is to say along the axis z. in order to increase the amount of light rays 20 directed towards the channel 3, a deflection structure 6 can be associated with one or more source(s) 2, 2g, 2b, 2r.

FIG. 2A illustrates a first example of a deflection structure 6 formed on the emission face 21 of a LED or OLED type source. This deflection structure 6 can be in the form of a nanostructured layer with an effective index gradient in the xy plane. It typically comprises patterns 61 of variable size in the xy plane. The patterns 61 can be based on silicon oxide SiO. These patterns 61 are separated from each other by an equally variable pitch. In order to obtain an index gradient, the pitch separating the patterns as well as the size of the patterns are less than the main wavelength of the source 2. Preferably, the pitch and/or the size of the patterns 61 vary monotonously and linearly. This allows obtaining a linear index gradient. Such an index gradient advantageously allows deflecting the light rays 20 by an angle θ relative to the optical axis (O) of the source 2.

Figure 2B:
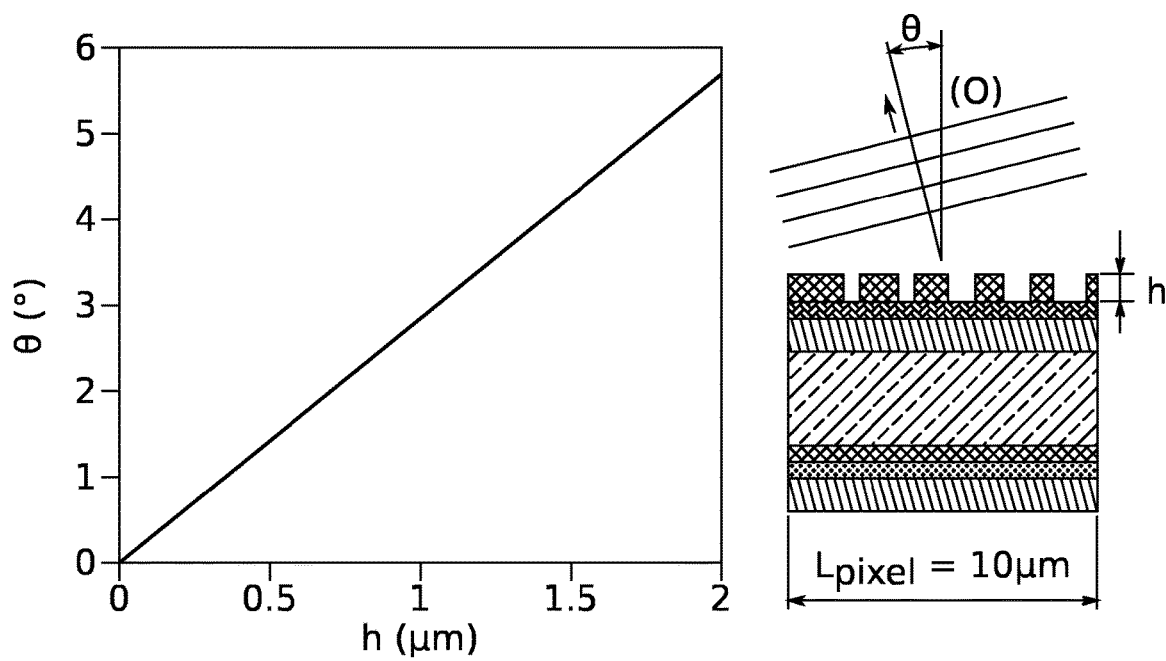
FIG. 2B shows a variation in emission angle as a function of the height of the deflection structure of the emitter illustrated in FIG. 2A.

FIG. 2B shows the variation of the angle θ as a function of the height h of the patterns 61 of the deflection structure 6. For a height h of the patterns 61 comprised between 0.5 µm and 1.5 µm, it is thus possible to obtain a deflection by an angle θ in the range of 2° to 3°. This may be sufficient to increase the amount of light rays 20 directed towards the channel 3. The efficiency of the sensor 1 is thus improved.

Figure 3A:
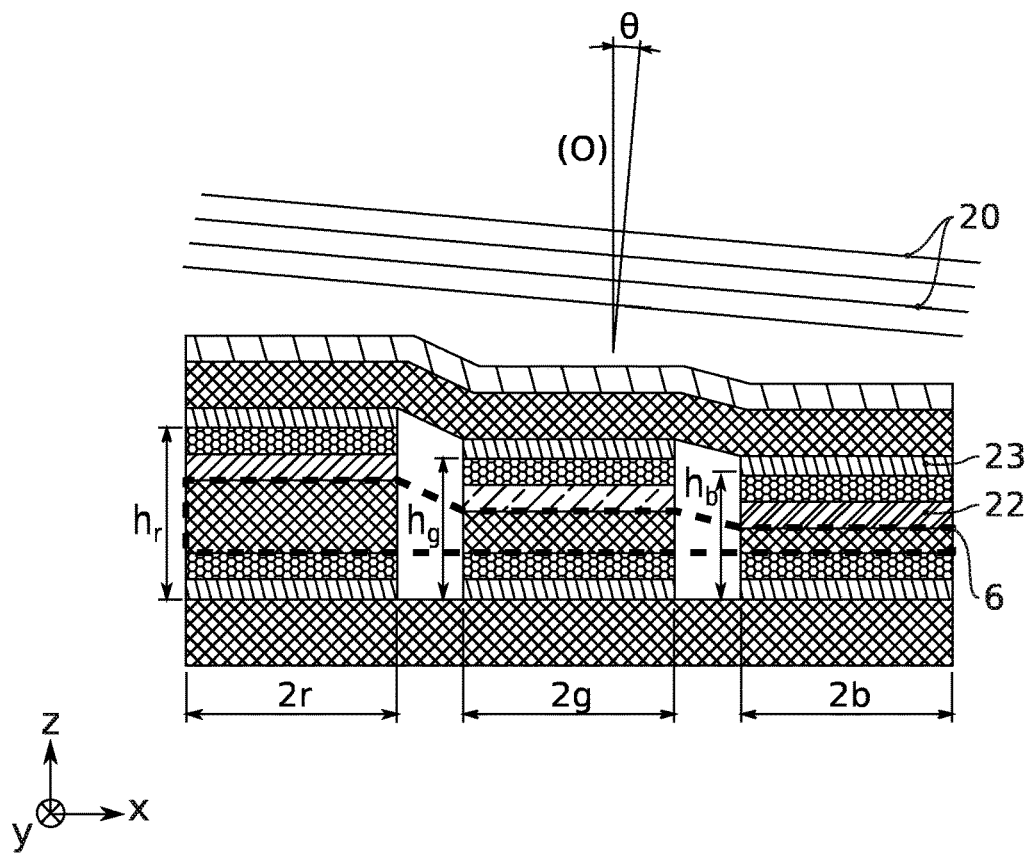
FIG. 3A illustrates schematically in section a plurality of emitters associated with a deflection structure according to another embodiment of the present invention.

According to another possibility illustrated in FIG. 3A, the deflection of the light rays 20 can be obtained by varying the cavity height of several adjacent sub-pixels 2r, 2g, 2b. In this example the height $h_r$ of the sub-pixel 2r is greater than the height $h_g$ of the sub-pixel 2g, and the height $h_g$ of the sub-pixel 2g is greater than the height $h_b$ of the sub-pixel 2b. This variation in height can typically be obtained by varying the thickness of the layers constituting the different sub-pixels 2r, 2g, 2b, for example the carrier injection layers. The deflection structure 6 is herein integrated within several adjacent sub-pixels 2r, 2g, 2b.

Figure 3B:
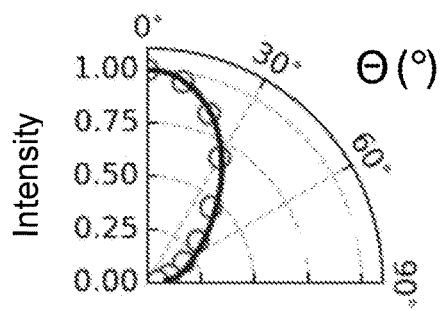
FIG. 3B shows an emission indicator for standard Lambertian transmitters.
Figure 3C:
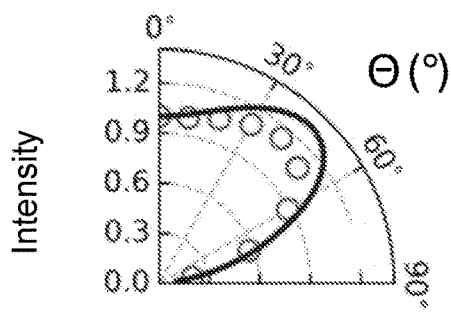
FIG. 3C shows an emission indicator for the emitters illustrated in FIG. 3A.

As illustrated in FIGS. 3B, 3C, the emission indicator can be significantly distorted by varying the cavity heights $h_r$, $h_g$, $h_b$. Thus, in the absence of height variation ($h_r$=$h_g$=$h_b$), the main emission direction of the sources 2r, 2g, 2b (maximum intensity of the emission indicator) is substantially parallel to the optical axis (O) (θ=0°, FIG. 3B). By varying the heights $h_r$, $h_g$, $h_b$ of the sources 2r, 2g, 2b as illustrated in FIG. 3A, the main emission direction of the sources 2r, 2g, 2b (maximum intensity of the emission indicator) is deflected by at an angle θ in the range of 45° relative to the optical axis (O) (FIG. 3C).

The reader might refer to the document "Analysis and optimization on the angular colour shift of RGB OLED displays, G. TAN et al., OPTICS EXPRESS 33629, Vol. 25, No. 26 (2017)" to adjust the deflection angle θ depending on the thickness of the injection layers of carriers of OLED sources emitting according to different wavelengths A. This second example of a deflection structure 6 advantageously allows significantly diverting the light rays 20, by several tens of degrees relative to the optical axis (O).

According to another possibility (not illustrated), the deflection structure 6 can be a photonic crystal coupled to the source 2. The document "*Highly Directional Emission and Beam Steering from Organic Light-Emitting Diodes with a Substrate Diffractive Optical Element*, S. Zhang et al., Adv. Optical Mater., 2, 343-347 (2014)" shows that such a structure allows considerably changing the emission indicator, to obtain an anisotropic emission in an emission direction forming an angle θ in the range of 45° to 60° relative to the optical axis (O). Other deflection structures 6 can still be used, for example a refractive microlens coupled to the source 2.

In what follows, different spatial arrangements of the sources 2, 2r, 2g, 2b and photodetectors 4 around the channel 3 are proposed. These arrangements aim at optimising the illumination of the particles and the detection of the light rays backscattered by these particles.

Figure 4A:
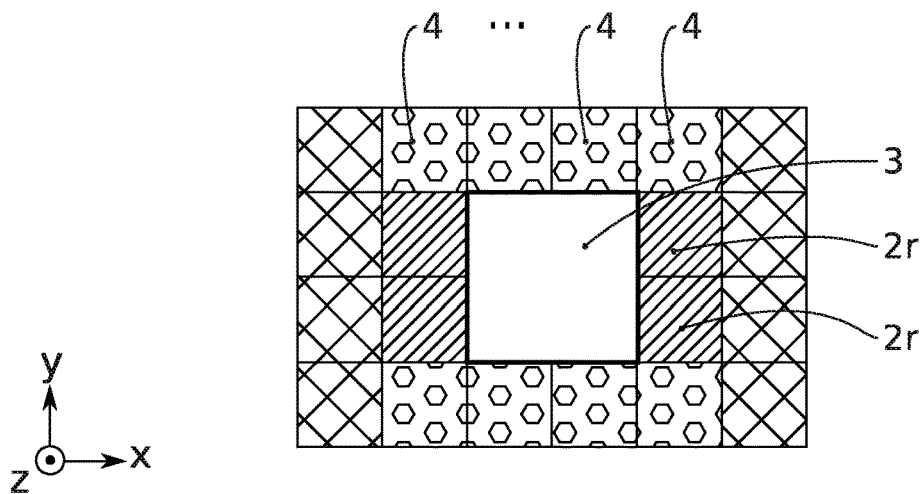
FIGS. 4A to 4C schematically illustrate a particle sensor according to different embodiments of the present invention.
Figure 4B:
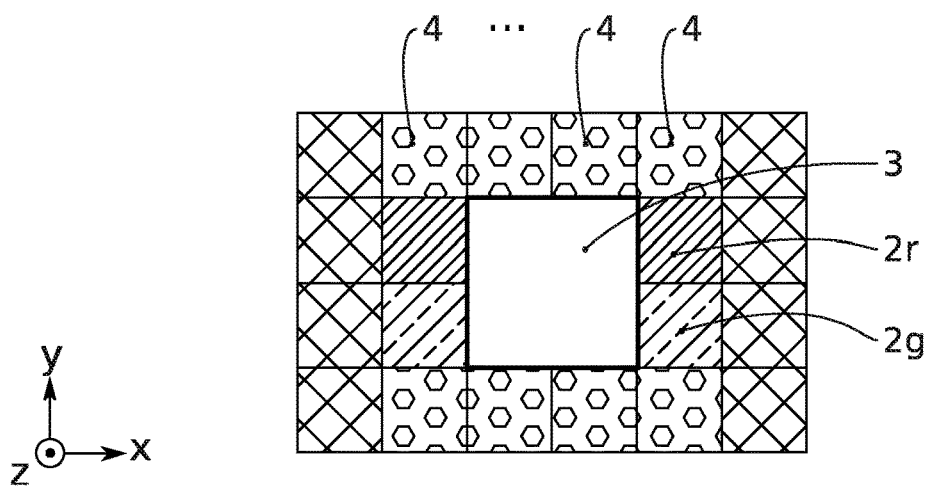

FIGS. 4A to 4B show different configurations of emission and detection matrices, in top view. The channel 3 can be partially bordered, for example on two opposite edges, by red pixels 2r (FIG. 4A). According to another example, the channel 3 can be partially bordered, for example on two opposite edges, by red 2r and green 2g pixels (FIG. 4B). The channel 3 can be partially bordered, for example on two other opposite edges, by photodetectors 4. The photodetectors 4 can be twice as numerous as the colour pixels. This allows obtaining an extended scattering diagram. This allows obtaining a good overall sensitivity of the sensor.

Figure 4C:
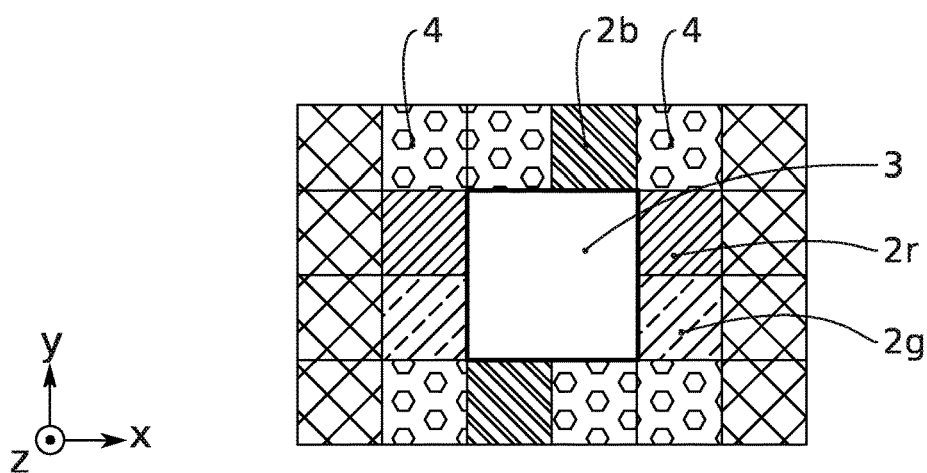

According to another example, the channel 3 can be partially bordered by red 2r, blue 2b and green 2g pixels (FIG. 4C). This allows obtaining scattering diagrams at different wavelengths.

FIGS. 5A to 5D show different concentric configurations of sources 2, 2r, 2g, 2b and of photodetectors 4, in top view. These free forms can be obtained by technologies based on organic materials. The sources are herein typically OLEDs and the photodetectors are herein typically OPDs.

Figure 5A:
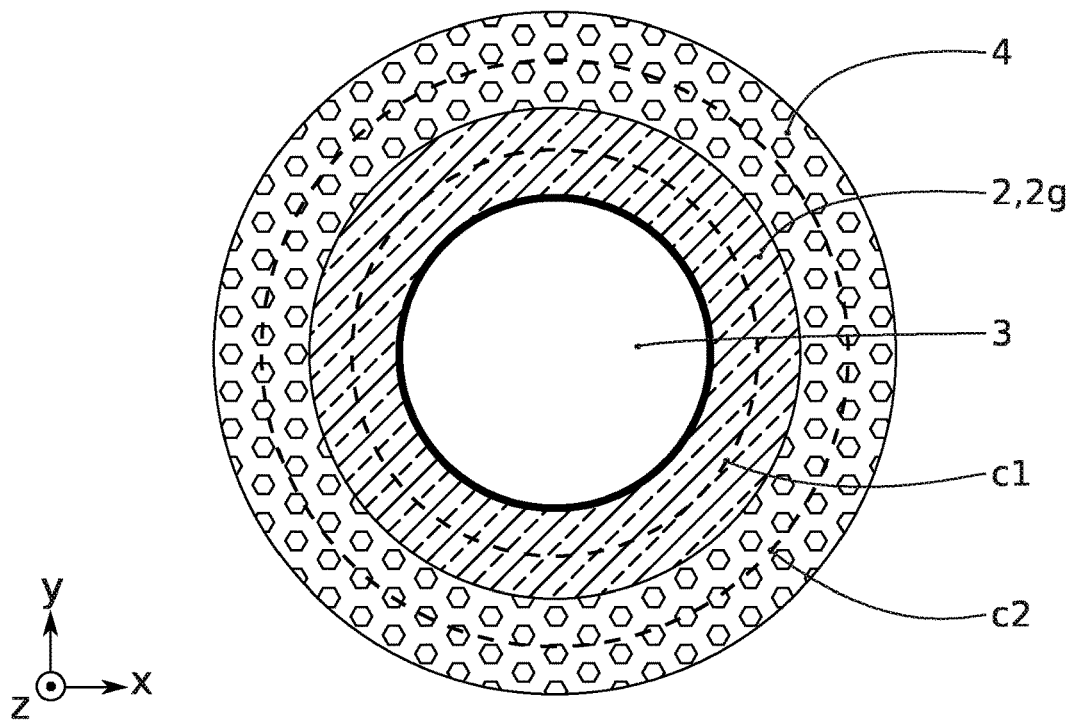
FIGS. 5A to 5D schematically illustrate a particle sensor according to other embodiments of the present invention.

The channel 3 can thus be totally surrounded by a single OLED source 2, 2g (FIG. 5A). This allows homogeneously illuminating the channel 3. This OLED source 2, 2g can be totally surrounded by a single OPD 4. In general, the OLED source 2 can extend along a circuit c1 and the OPD photodetector 4 can extend along a circuit c2. The circuits c1, c2 can be circular or oval, or can have other shapes. They can be concentric.

Figure 5B:
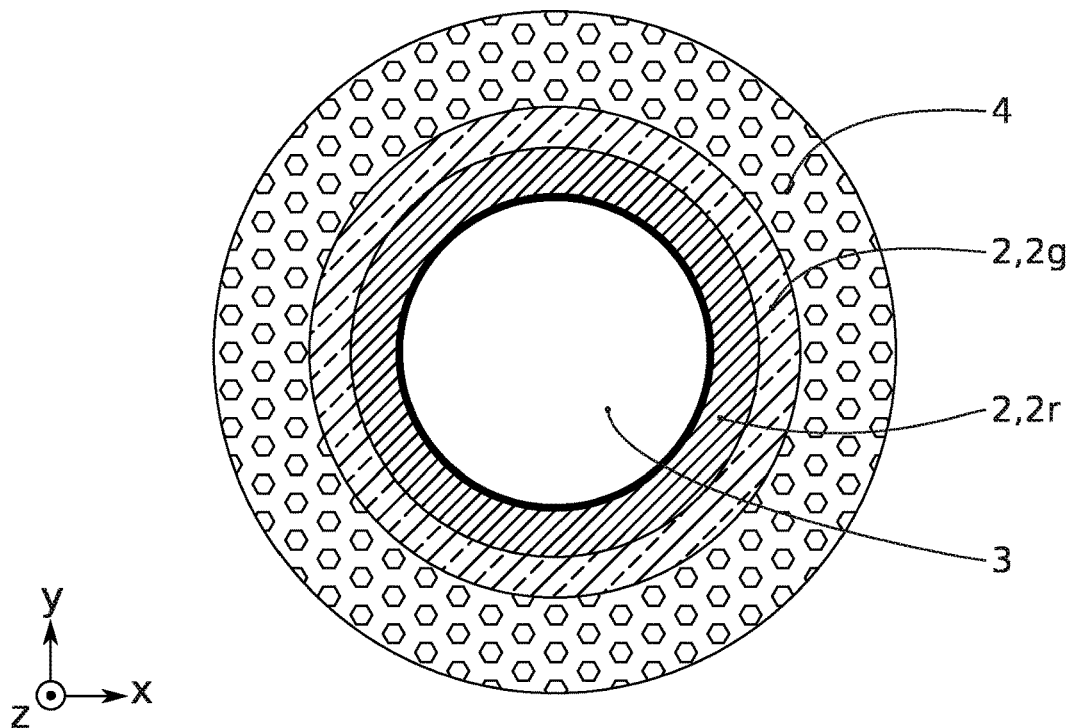
Figure 5C:
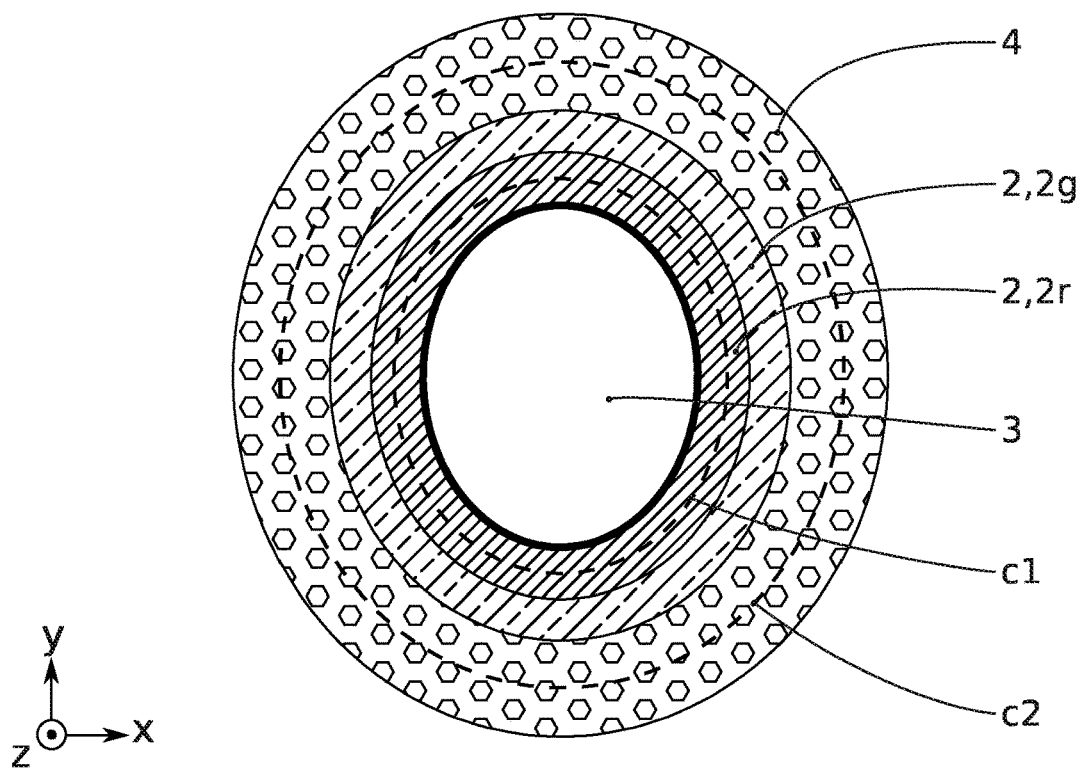

FIG. 5B illustrates a channel 3 totally surrounded by several circular and concentric OLED sources 2g, 2r. FIG. 5C illustrates a channel 3 totally surrounded by several oval and concentric OLED sources 2g, 2r.

Figure 5D:
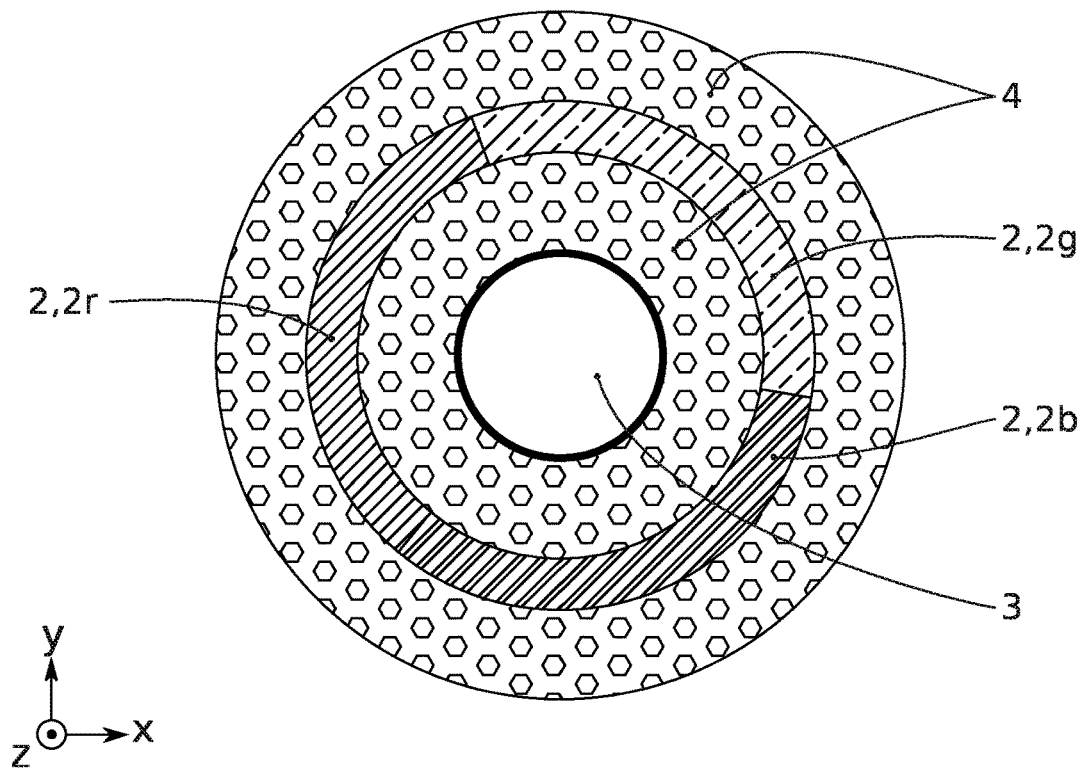

FIG. 5D illustrates another embodiment where the channel 3 is totally surrounded by a first OPD 4. This first OPD 4 is surrounded by an OLED ring comprising three portions 2g, 2r, 2b of different colours. This OLED ring 2g, 2r, 2b is itself surrounded by a second OPD 4.

Depending on the needs, other configurations can be considered based on these few embodiments illustrated in FIGS. 4A-4C and 5A-5D.

The invention is not limited to the described embodiments, but extends to any embodiment falling within the scope of the independent claims.

The invention claimed is:

1. An optical particle sensor comprising:
   at least one light source configured to emit light rays,
   at least one channel configured to receive a fluid transporting at least one particle, and to at least partially receive the light rays emitted by the at least one source, wherein the light rays are partially scattered by the at least one particle, and
   at least one photodetector configured to receive scattered light rays, wherein
   the at least one source has an emission face facing one side of the sensor,
   the at least one photodetector has a receiving face facing the one side of the sensor,
   the light rays received by the at least one photodetector are light rays backscattered by the at least one particle, and
   walls which delimit a volume inside which the channel extends and the light rays emitted by the at least one source are propagated, said walls being configured, by at least one of a coating on the walls and a roughness of the walls, to prevent at least 90% of light rays which are not scattered by the at least one particle from reaching the at least one photodetector.

2. The optical sensor according to claim 1 configured such that the light rays received by the at least one photodetector are only light rays backscattered by the at least one particle.

3. The optical sensor according to claim 1, configured such that the light rays received by the at least one photodetector are not reflected after having been scattered by the at least one particle.

4. The optical sensor according to claim 1, wherein the at least one of a coating on the walls and a roughness of the walls prevents at least 95% of light rays which are not scattered by the at least one particle from reaching the at least one photodetector.

5. The optical sensor according to claim 4, wherein the walls absorb at least 95% of the light rays which are not scattered by the at least one particle.

6. The optical sensor according to claim 1, wherein the emission and receiving faces are entirely contained in a space delimited by two parallel planes, the optical sensor being configured such that the at least one particle is located outside this space when it scatters the light rays.

7. The optical sensor according to claim 1, wherein the emission and receiving faces are parallel to each other.

8. The optical sensor according to claim 1, wherein the emission and receiving faces are planar and located substantially in a same plane.

9. The optical sensor according to claim 1, wherein the at least one source and the at least one photodetector are disposed around the at least one channel and transversely to said at least one channel.

10. The optical sensor according to claim 1, wherein the at least one source and the at least one photodetector are continuously distributed around the channel.

11. The optical sensor according to claim 1, wherein the at least one source entirely surrounds the at least one channel, the at least one source comprising one of a single source and a plurality of sources.

12. The optical sensor according to claim 1, wherein the at least one source has a shape of a ring or ring portion at least partially surrounding the at least one channel.

13. The optical sensor according to claim 1, wherein the at least one source is disposed along a first circuit around the at least one channel, and wherein the at least one detector is disposed along a second circuit around the at least one channel, said first and second circuits being concentrically arranged around the at least one channel.

14. The optical sensor according to claim 1, comprising a deflection structure and wherein the light rays emitted by the at least one source are deflected towards the at least one channel by the deflection structure.

15. The optical sensor according to claim 14, wherein the deflection structure is formed on the emission face and has a refractive index gradient in a plane parallel to the emission face.

16. The optical sensor according to claim 14, wherein the deflection structure is selected from a photonic crystal and a refractive microlens.

17. The optical sensor according to claim 14, wherein the at least one source comprises at least two adjacent light emitters each comprising an emission cavity of different height, and wherein the deflection structure is formed by the difference in heights between the emission cavities of said at least two adjacent light emitters.

18. The optical sensor according to claim 1, wherein at least one of the at least one source is an organic light-emitting diode (OLED) and the at least one photodetector is an organic photodetector (OPD).

19. The optical sensor according to claim 1, wherein the at least one source comprises a plurality of light emitters, said light emitters being arranged in the form of an emission matrix and wherein the at least one photodetector comprises a plurality of light detectors, said light detectors being arranged in the form of a detection matrix and said emission and detection matrices being arranged such that the light emitters are alternated with the light detectors.

20. The optical sensor according to claim 19, wherein all light detectors are separated from each other by emitters.

21. The optical sensor according to claim 19, wherein the plurality of light emitters comprises first, second and third subsets of light emitters, the light emitters of said subsets being configured to emit light radiations having respectively first, second and third wavelengths which are different from each other.

22. The optical sensor according to claim 19, configured to allow one of a sequential switch-on and a sequential switch-off of the light emitters.

23. An optical particle sensor comprising:
at least one light source configured to emit light rays,
at least one channel configured to receive a fluid transporting at least one particle, and to at least partially receive the light rays emitted by the at least one source, wherein the light rays are partially scattered by the at least one particle, and
at least one photodetector configured to receive scattered light rays, wherein
the at least one source has an emission face facing one side of the sensor,
the at least one photodetector has a receiving face facing the one side of the sensor, and
the light rays received by the at least one photodetector are light rays backscattered by the at least one particle,
wherein the at least one source entirely surrounds the at least one channel, the at least one source comprising one of a single source and a plurality of sources.

24. An optical particle sensor comprising:
at least one light source configured to emit light rays,
at least one channel configured to receive a fluid transporting at least one particle, and to at least partially receive the light rays emitted by the at least one source, wherein the light rays are partially scattered by the at least one particle, and
at least one photodetector configured to receive scattered light rays, wherein
the at least one source has an emission face facing one side of the sensor,
the at least one photodetector has a receiving face facing the one side of the sensor, and
the light rays received by the at least one photodetector are light rays backscattered by the at least one particle,
wherein the at least one source comprises a plurality of light emitters, said light emitters being arranged in the form of an emission matrix and wherein the at least one photodetector comprises a plurality of light detectors, said light detectors being arranged in the form of a detection matrix and said emission and detection matrices being arranged such that the light emitters are alternated with the light detectors.

* * * * *